Sept. 6, 1960 E. E. BAUMAN 2,951,909

SUBSTATION SIGNALLING DEVICE

Filed Oct. 9, 1958

INVENTOR.
EDWARD E. BAUMAN

BY Brown Jackson Boettcher & Dienner

United States Patent Office 2,951,909
Patented Sept. 6, 1960

2,951,909

SUBSTATION SIGNALLING DEVICE

Edward E. Bauman, Galion, Ohio, assignor to North Electric Company, Galion, Ohio, a corporation of Ohio Filed Oct. 9, 1958, Ser. No. 766,333
5 Claims. (Cl. 179—84)

Figures 1, 2:
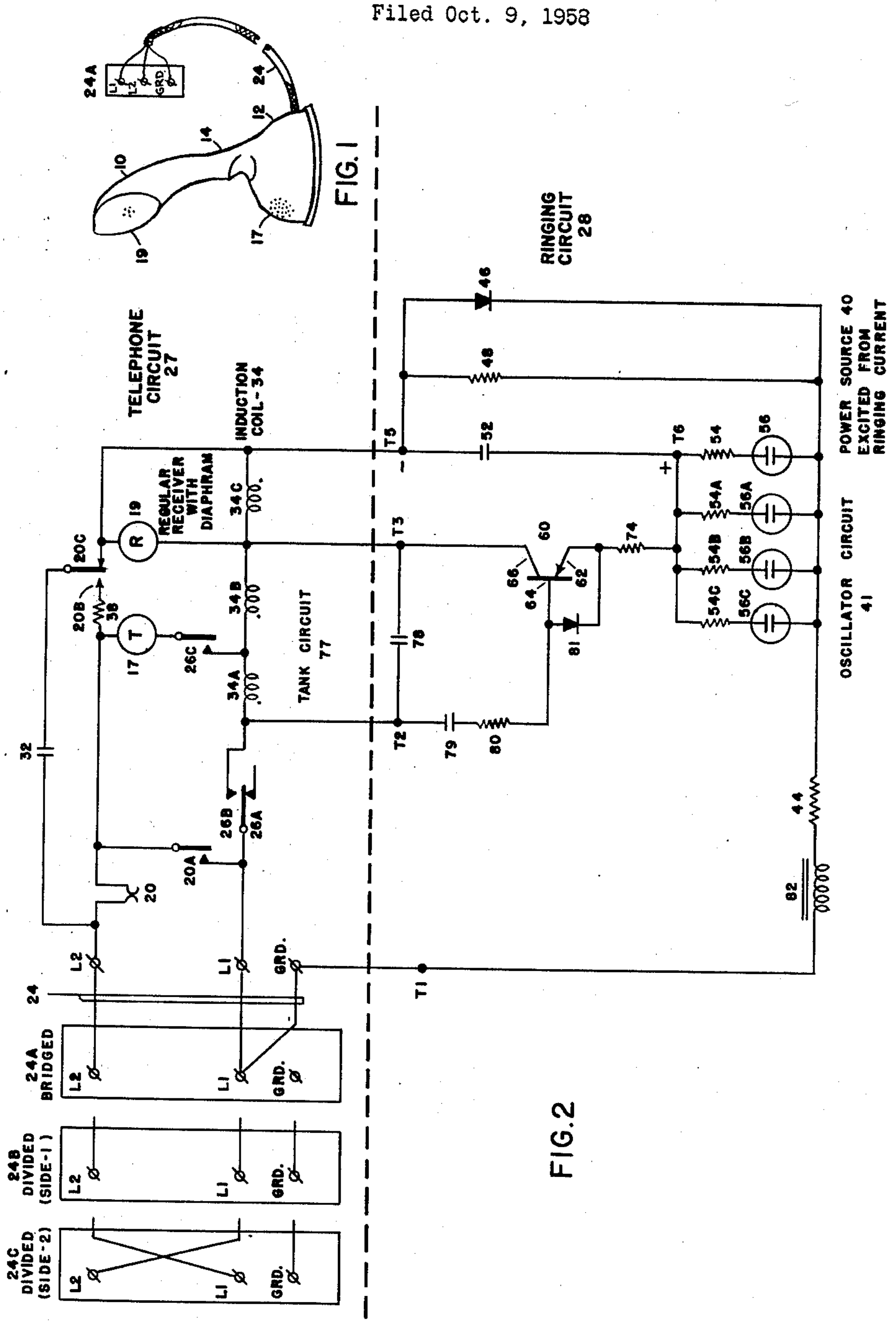

The present invention relates to a new and novel signalling arrangement for a telephone substation set.

In the recent stages of development of the telephone field, new and novel telephone substation sets of substantially reduced size and weight have been provided, specific examples of certain of which are set forth in U.S. Patent Nos. 2,405,543 and 2,411,938, and others. The development of such type equipment demanded, and, in turn, has resulted in, the discovery of a new and novel ringing signalling device for use therewith which is more compact, lighter in weight and which has a more pleasant sound to the ear. One specific embodiment of a substation signalling device which successfully fulfilled such requirements is set forth in copending application which was filed January 22, 1958, and was assigned Serial No. 710,563. The present application is a continuation-in-part of such application.

It is a particular object of the present invention to provide a novel signalling system which includes the desirable attributes of the previous signalling device, while yet utilizing a smaller number of components to further reduce the size and weight of the signalling means.

It is a further object of the invention to provide a device of such type which emits a pleasant melodious signal of increased volume without a sacrifice of the tone quality.

It is an additional object of the invention to provide a novel signalling circuit which may be used with substations in an increased number of ringing arrangements and particularly in systems which include divided and bridged signalling arrangements. Such increased flexibility in adaptation for different ringing applications is, of course, essential to the ready acceptance of a signalling device for use in the field.

A further object of the invention is to provide an improved system arrangement which includes increased protection for the components of the arrangement without requiring the addition of expensive and complicated protection devices.

According to a feature of the invention, one embodiment of the improved signalling device comprises a power source which converts alternating current ringing signals to undulating direct current signals, and means for coupling the undulating signals to an oscillator circuit which couples substantially sine wave output signals of a variable amplitude to the diaphragm of the receiver of the substation device. The receiver diaphragm responsively vibrates to issue a pleasant melodious tone output having a warble effect thereon.

These and other features of the invention will become apparent with reference to the following specification and claims when considered in relation to the accompanying drawings in which—

Figure 1 is a perspective view of a telephone instrument of the standing handset type, which includes the novel signalling arrangement therein; and Figure 2 is a schematic illustration of the components of the telephone substation of Figure 1, including the components of the novel signalling arrangement; the portion of the circuitry appearing above the dotted line representing the equipment which is normally included in a standing handset substation, and the components below the dotted line indicating the additional circuitry which is utilized in combination with the existing telephone circuitry to provide the novel signalling arrangement.

*General description*

The new and novel signalling device of the invention lends itself to use in any of the conventional types of substation devices, and as shown herein is adapted particularly for use with the telephone instrument known in the art as a standing handset. With reference to Figure 1, one embodiment of the standing handset substation may comprise a molded instrument 10 having a base portion 12 with a flat bottom support face on which the unit normally rests, and an elongated receiver supporting handle 14 which extends upwardly from the base portion 12 of the device. A transmitter section 17 is located in the base, and a receiver section 19 is located at the upper end of the receiver handle 14. A conventional dial mechanism (not shown) is located in a recessed portion on the bottom of the base 12, and a plunger switch located centrally of the bottom face operates in the manner of a hook switch of a conventional substation set. A cord 24 including line conductors L1, L2 and ground conductor "GRD" terminates at a wall terminal block or plug to permit ready connection of the substation instrument to a line of the telephone exchange.

The telephone circuit and ringing circuit components are disposed within the substation instrument housing as schematically indicated in the above identified copending application.

*Circuit network description*

The components of the novel ringing circuit 28, and the manner of connecting same with the telephone circuit 27 of a substation instrument 10 of the type set forth in Figure 1, is schematically shown in Figure 2. With reference thereto, the telephone circuit 27 and ringing circuit 28 are connected to a line of the system by means of a cord 24 including conductors L1, L2 and GRD and a plug or wall terminal block 24A alternatively according to each of several different modifications, identified in the drawing as bridged (24A), divided side 1 (24B) and divided side 2 (24C). A more detailed description of the connections of the plugs for use in bridged and divided type ringing arrangements is set forth hereinafter.

The plug, such as 24A and cord 24 including conductors L1, L2 and GRD, as connected to a line of the system effects coupling of the ringing signals which appear on the line to the components of the telephone circuit 27 and ringing circuit 28. More specifically, telephone circuit 27 as schematically represented in Figure 2, basically comprises a transmitter 17, a receiver element 19, and an induction coil 34 including windings 34A, 34B, 34C (windings 34A and 34B being wound in opposite relation to 34C), capacitor 32, resistor 38, dial pulse contacts 20, dial off-normal contacts 20A, 20B and 20C and plunger switch contacts 26B and 26C.

With the instrument in its normal idle condition, the plunger switch on the base of the instrument is depressed, and the dial is in its normal condition, whereby the contacts 20, 20A, 20B, 20C, 26B and 26C are in the position shown in the drawing. The transmitter 17 is disconnected from the line by reason of the open plunger switch contacts 26C, and the dial pulsing contacts 20 are rendered ineffective by the open condition of the dial off-normal contacts 20A, 20B. In arrangements in which the plug is connected for bridged ringing (24A), the ringing circuit 28 is connected across the line conductors L1, L2; in arrangements in which the plug is connected for divided ringing side 1 (24B), the ringing circuit 28 is connected across incoming line conductor L2 and the ground conductor GRD to ground, and in arrangements in which the plug is connected for divided ringing side 2 (24C), the ringing circuit 28 is connected across line conductor L1 and the ground conductor to ground. In the following description the bridged ringing connection will be assumed, the paths for the signals in the event of a divided ringing connection being evident therefrom.

Assuming first that the subscriber initiates an outgoing call, as the subscriber lifts the telephone substation instrument 10 from its idle at rest sitting position, the plunger switch (not shown) is released, and plunger switch contacts 26B and 26C connect the network including transmitter 17 across the incoming conductors L1, L2 (in the bridged ringing arrangement which is described hereat for exemplary purposes), whereby a transmission circuit extends from the line conductor L1 over contacts 26B, induction coil winding 34A, plunger switch contacts 26C, transmitter 17, and dial contacts 20 to the line conductor L2. Receiver element 19 is connected across line conductors L1, L2 over the circuit extending from conductor L1 over contacts 26B, induction coil windings 34A, 34B, receiver 19 and induction coil 34C in parallel, contacts 20C and capacitor 32 to the line conductor L2.

As the subscriber moves the dial from its normal position to the number on the dial plate which corresponds to the first digit to be dialed, the dial off-normal contacts 20A are closed to complete a separate pulsing circuit in shunt of the transmitter elements 17, receiver unit 19, and induction coil 34, which circuit extends from line conductor L1, dial off-normal contacts 20A and dial pulsing contacts 20 to conductor L2. Simultaneously, dial off-normal contacts 20B are closed and dial off-normal contacts 20C are opened, whereby a protective circuit is completed across the dial pulsing contacts 20, the circuit extending from the right hand side of dial pulsing contacts 20 over resistor 38, contacts 20B and capacitor 32 to the left hand side of the dial contacts 20. As the dial wheel is released the dial pulsing contacts 20 are opened and closed a number of times consistent with the value of the digit dialed, and the resultant impulses are transmitted over the line conductors L1, L2 to the distant exchange. Each of the digits of the desired number are transmitted in this manner to control the exchange switching equipment to effect the desired connection.

As the dial wheel is restored to its off-normal condition following the transmission of the last of the digits of the desired number, dial off-normal contacts 20A and 20B are opened to disable the dialing circuit, and contacts 20C are closed to reconnect the receiver 19 across line conductors L1, L2 for use in the established connection. A conversation may then be effected over the line conductors L1, L2 which extend between the subscribers at the respective substations.

*Ringing circuit*

In the extension of a connection to a desired substation in response to the receipt of digit representing impulses from the dial of a calling substation as above described, the switching equipment in the exchange selects the desired line and transmits ringing signals thereover. In the present exemplary description, it will be assumed that twenty cycle alternating ringing signals are coupled to the desired line as selected.

The operation of the novel signalling equipment including the ringing circuit 28 of the substation 10 in response to the application of ringing signals to its line conductors L1, L2, is now set forth. As noted above, in a substation 10 having bridged ringing plug connections, the ringing circuit 28 is connected across the line conductors L1, L2 during the period that the instrument 10 is resting on its bottom face base and the plunger switch is in the depressed condition. As shown in Figure 2, with the substation 10 in such position, contacts 20C are closed to connect conductors L1 and L2 across the ringing circuit 28. In the divided ringing arrangement, as noted hereinbefore, the ringing circuit 28 is connected alternatively between conductors L1 and ground, or L2 and ground.

The ringing circuit 28 includes terminal T1 which is connected to the substation ground terminal and terminals T2, T3 and T5, which are connected across the coils 34A—34C of the induction coil 34. The novel ringing arrangement 28 which is controlled in its operation by the signals over terminals T1, T2, T3 and T5, basically comprises a power source 40 and an oscillator circuit 41. Power source 40 is operative responsive to the application of the ringing signals thereto over terminals T1, T5 to couple undulating direct current output signals to the oscillator circuit 41, which in turn operates to couple substantially sine wave output signals of variable amplitude to the telephone receiver 19, the diaphragm of which vibrates in response thereto. The frequency of the sine wave output signals of the oscillator circuit 41 is related to the mechanical resonating frequency of diaphragm of receiver 19 to effect the mechanical actuation thereof and the generation thereby of a melodious tone call signal.

More specifically, the power source 40 basically includes the capacitor 32 (which is also used in the dialling operation for contact protection purposes), three parallel branches including a first branch having rectifier 46 connected therein, a second branch including resistance 48 connected therein and a third branch including a capacitor 52 connected in series with a plurality of parallel connected resistance and neon lamp sets 54, 56. In the specific embodiment shown herein, four commercially available neon lamps 56—56C were used with four resistances 54—54C to provide the desired potential drop and to insure that all lamps fire. It will be apparent, however, that a single neon lamp 56 and resistance 54 of the proper equivalent value may be readily substituted therefor.

The three parallel branches are further connected over resistance 44, choke coil 82 and terminal T1 to the substation ground terminal GRD, which in the illustrated bridge ringing plug connection, is extended over plug 24A to line L1.

The power source 40 as energized by the ringing signals effects the provision of an undulating direct current potential which is coupled over terminals T5 and T6 to the oscillator circuit 41.

The oscillator circuit 41 basically comprises a semiconductor device, such as PNP transistor 60, which may be of the type commercially available as a 2N461 transistor, and which includes an emitter element 62, a base element 64, and a collector element 66. Emitter element 62 is connected over resistor 74 and terminal T6 to the output side of power source 40; base element 64 is connected over resistor 80, coupling capacitor 79 and terminal T2 to the left hand side of the induction coil 34, and the collector element 66 is connected over terminal T3 to the parallel combination of the receiver unit 19 and induction coil 34C and terminal T5 to the power source 40. A capacitor 78 is connected across terminals T2, T3 in parallel with the induction coils 34A and 34B to provide a tank circuit 77 for the oscillator circuit 41.

*Operation of ringing circuit*

As noted above (and as shown in Figure 2), with the telephone handset in the idle condition (the plunger switch depressed as the result of the handset being at rest on its base), the plunger switch contacts 26B and 26C will be open, the dial off-normal contacts 20C will be closed, and dial off-normal contacts 20A and 20B will be opened, whereby the ringing circuit 28 is connected across the input terminals L1, L2.

With the application of ringing current signals to the line conductors, and over the terminals L1, L2 of the plug 24A for the telephone substation set 10, the power source 40 is operative to couple undulating direct current output signals over the terminals T5, T6 to the oscillator circuit 41 much in the manner of the embodiment of the above identified application, the output signal waveform being similar to that set forth in Figure 6A thereof. Accordingly only a brief description of the operation of power source 40 is set forth hereat.

More specifically, as a ringing signal is first received over line conductors L1, L2 and the terminals L1, L2 of the plug 24A, capacitor 32 is charged over the circuit which extends from substation terminal L2 over capacitor 32, contacts 20C, rectifier 46, resistance 44, choke coil 82, terminal T1 and terminal L1 of the substation plug 24A, the charging circuit being completed only during the period of time during which the half cycle of the applied ringing circuit is of the polarity to enable the conductivity of rectifier 46 (conductor L2 positive relative to L1 in the showing of Figure 1).

As the capacitor 32 is charged, the ringing current coupled over such circuit thereafter is superimposed on the voltage of capacitor 32, and the resultant voltage wave is of a value which controls the rectifier 46 to conduct only during a relatively small portion of each ringing cycle. As a result, the ringing current flows over resistor 48 during the major portion of each ringing cycle. Resistance 48 is of a relatively high value, and during the period that the rectifier 46 is blocked, the voltage drop across resistance 48 is increased to a value which is equal to or in excess of the firing voltage of the neon lamps 56—56C which fire and rapidly settle to the sustaining voltage therefor.

As the neon lamps 56—56C fire, a voltage builds up across capacitor 52 and is coupled over terminals T5, T6 to the oscillator circuit 41, the value of the voltage coupled to the oscillator circuit being determined by the values of the capacitor 52, and the plurality of sets of resistors and lamps 54—56. The voltage across C52 is applied to the oscillator circuit. As the voltage across resistor 48 decreases to a value less than the sustaining voltage of lamps 56—56C, the neon lamps 56A—56C are extinguished and the capacitor 52 discharges through the circuit which extends over terminal T6, resistor 74, transistor 60 and coil 34C to terminal T5 back to condenser 52. The time constant of the discharge through the oscillator circuit is such that the condenser is not fully discharged before recharging due to the subsequent ringing cycle occurs. Terminal T6 therefore always remains positive with respect to terminal T5 during the ringing cycle. As will be more fully described hereinafter, the undulating nature of the output potential which appears across capacitor 52 applied to the oscillator 41 introduces a warble into the tone output signal of the signalling arrangement.

It will be apparent from the foregoing description that the terminals T6 and T5 in effect become the poles of a pulsating or undulating direct current power source, terminal T6 being the positive pole and terminal T5 being the negative pole, and that undulating direct current output of such source is coupled to the oscillator circuit 41 for the period that ringing signals are coupled to the ringing circuit 28.

With the application of such potential output to terminals T5, T6, the oscillator circuit 41 operates to provide output signals to the receiver unit 19 to effect the actuation of the receiver diaphragm in a resonating manner. More specifically, the transistor unit 60 of oscillator circuit 41 has its emitter element 62 connected over resistor 74 to the positive pole T6 of the power source 40, and its collector element 66 connected over induction coil 34C to the negative pole T5 of the power source 40. The base element 64 is connected over resistor 80, coupling capacitor 79, and the tank circuit 77 to the collector element 66. It is significant to note that the base element 64 has no other bias connection, and that the base element is therefore of a semi-floating nature. Rectifier 81 is connected between the base and emitter elements of the transistor 60, and is poled to conduct current in a direction opposite to the direction of forward current flow of the emitter-base circuit.

As a result of the emitter-collector leakage current and the undulation of the direct current signal output of power source 40, a changing current flow occurs in the collector circuit of transistor 60 including winding 34C of induction coil 34. With the change of current flow in winding 34C, a voltage of proper phase is induced across windings 34A, 34B which is coupled over coupling capacitor 79 and resistor 80 to the base element 64 of transistor 60 to bias the base negative, and thereby promote emitter-base current flow. Such flow, in turn, results in an increased emitter-collector current flow. With such increased current flow, the rate of change of current flow increases in the collector circuit, and an increasingly negative signal is regeneratively fed back over induction coil 34 to the base element 64 to effect a further increase in current conductivity of transistor 60. The current flow progressively increases in such manner until such time that the collector approaches the positive potential of the emitter, and the transistor reaches saturation.

With the occurrence of the saturation of transistor 60, the rate of change of current in coil 34C is decreased, and the resultant flux decay in the induction coil causes a regenerative effect in the opposite direction which begins to bias the base of the transistor increasingly less negative. As a result of such biasing, a reduced current flow occurs, and the decreasing current flow effects the provision of a signal in the tank circuit which accentuates the biassing of the base element 64 less negative. Such action continues until the potential of the base element 64 becomes positive with respect to the emitter element 62. At such time, the transistor has been driven to the cut-off point, and emitter-base current flow ceases. The tank circuit 77 in its oscillation causes the potential of the base to become increasingly more positive, reaching a maximum and then becoming increasingly less positive, and current flows through the rectifier 81 in the forward direction while the potential of the base builds up to its maximum positive value, and thereafter decreases until the base attains the same potential as the emitter. During this conduction period of the rectifier 81, its low forward resistance maintains a low potential externally from base to emitter, thus protecting the transistor from high reverse potential.

When the tank circuit in its continued oscillation causes the potential of the base to become less negative than the emitter, the transistor 60 once more conducts to initiate a second cycle of oscillation. Each time during the cycle when the transistor conducts it furnishes power to replace the losses in the tank circuit to keep the tank oscillating.

The components of the oscillator circuit 41 are selected to provide a substantially sinusoidal waveform of a variable amplitude for coupling to the receiver 19, the components of the oscillator circuit 41, and particularly of tank circuit 77, being selected to effect a pulse output at a frequency which is related to the mechanical resonant frequency of the receiver 19 to thereby effect operation of the receiver diaphragm and the provision of a melodious tone output signal of good volume.

As noted above, the amplitude of successive sine wave signals generated by the oscillator circuit 41 is changed by reason of the change of value of the energizing signal coupled to oscillator circuit 41 by power source 40. Such variation in amplitude of the oscillator output signals, in turn, introduces a warble into the output tone signal of the receiver unit 19, and provides a more melodious and pleasant sounding signal.

*Guarding against spurious signalling due to dialing*

With reference to Figure 2, it is apparent that in the event that a substation set of the type illustrated is connected as an extension phone or as a phone on a party line, the ringing circuit 28 of such set is connected across the line conductors L1, L2 while the call is being initiated and completed by the subscriber at a second substation set connected to line conductors L1, L2. As a result, circuit prevention means are included in the ringing circuit arrangement to prevent the occurrence of "bell tapping" at the idle one of the substations 10 as another one of the substations on the line transmits outgoing impulse signals.

As noted in the copending application, as the pulses of the dial are coupled to the line two types of voltages appear across the line. The first type of pulse comprises a 48 volt peak to peak wave, and the second type of pulse is a sharp spike or series of short spikes which occur as a result of the change of the current in the inductance of the line. These sharp spikes are mainly of one polarity and of larger amplitude when the dial contacts open; and are of the opposite polarity and of a smaller amplitude when the dial contacts close. The components of the signalling device are connected to the line so that larger amplitude spikes are shunted over rectifier 46 to prevent the firing of neon lamps 56—56C. In order to guard against the smaller amplitude spikes of the opposite polarity firing the neon lamps 56—56C, a voltage divider comprising the resistors 48, 44, and the choke coil are connected to limit the voltage across resistor 48, and accordingly across the neon lamps 56—56C, below the firing potential of the lamps. Accordingly, spurious signalling at a substation as a result of the operation of the dial of another substation on the line is obviated.

*Specific embodiment*

The following sets of values were found to provide a melodious tone signal in an instrument of the type described:

Condenser 32—2 mf.
Condenser 52—3.5 mf.
Condenser 78—.01 mf.
Condenser 79—.01 mf.
Resistor 44—3000 ohms
Resistor 48—30,000 ohms
Resistor 54—8,200 ohms
Resistor 54A—8,200 ohms
Resistor 54B—12,000 ohms
Resistor 54C—8,200 ohms
Resistor 74—330 ohms
Neon lamp 56—NE82
Neon lamp 56A—NE82
Neon lamp 56B—NE81
Neon lamp 56C—NE82
Rectifier 46—1N92
Rectifier 81—210AX
Choke coil 82—15 henries; approximately 1000 ohms at low frequencies
Transistor 60—2N461
Induction coil A—32 ohms—540 turns
Induction coil B—46 ohms—608 turns
Induction coil C—125 ohms—356 turns As noted above, the oscillator circuit 41 of the invention is connected to provide a waveshape which is substantially a sine wave, the values of resistor 80 and capacitor 79 particularly being selected to accomplish such end. The value of capacitor 79 is further selected so as to effect operation thereof as a coupling capacitor rather than as a timing capacitor, and the value of resistor 80 is selected to prevent rectifier 81 from loading tank circuit 77. Rectifier 81, as noted above, provides protection for the transistor device 60 and a conduction path for coupling capacitor 79 and the tank circuit 77 during the periods that the transistor device 60 is biassed to cut-off.

A change in the value of resistor 74 effects a corresponding change in the tone characteristic of the output signal, and various values may be utilized to provide any one of a number of desired output tones. The impedance value of choke 82 is selected to prohibit the introduction of speech currents into the ringing circuit. The manner in which the value of other components of the system may be altered to effect other changes in the output signal will be apparent to parties skilled in the art.

Additionally it should be noted that as the voltage across 52 rises, a charging current flows through 74, and base-emitter circuit, through 80, 79, and 34. This charging current helps start the oscillator by supplying forward bias.

While what is described is regarded to be a preferred embodiment of the invention, it will be apparent that variations, rearrangements, modifications and changes may be made therein without departing from the scope of the present invention as defined by the appended claims.

What is claimed is:

1. In a telephone substation instrument adapted for use in a telephone system having connection means for coupling the substation instrument to a subscriber line in the telephone system, and a receiver unit having a diaphragm connected to reproduce voice signals which are coupled over said subscriber line and said connection means; call signal generating means for generating a modulated sine wave comprising a semiconductor device having at least a first and a second control member, a tank circuit and a coupling capacitor connected in series between said control members, said signal generating means producing a sine wave signal output at a frequency related to the mechanical resonant frequency of said receiver, means for converting alternating current ringing signals on said subscriber line into pulsating direct current signals, and means for applying said pulsating direct current signals to said semiconductor device to provide modulated sine wave signals during the entire period of the ringing signal.

2. A telephone substation instrument as set forth in claim 1 which includes choke coil means for isolating the voice signals on said line from said call signal generating means.

3. In a telephone substation instrument adapted for use in a telephone system including a receiver unit having a diaphragm for reproducing voice signals, signal generating means for generating diaphragm vibrating signals responsive to the coupling of ringing signals thereto including an oscillator circuit comprising a transistor device having an emitter element, a collector element and a base element, means for converting said ringing signals to a pulsating direct current signal, means for coupling said pulsating direct current signal to said emitter and collector elements to bias the emitter-collector path for conduction, a regenerative feedback circuit including a tuned circuit, a coupling capacitor, and resistor means connected between said base and collector elements operative responsive to the occurrence of leakage current in the emitter-collector path to provide an energizing signal to said base to initiate operation of the circuit in an oscillatory manner, a rectifier device connected between said base and said emitter elements to conduct in a direction opposite to the direction of current flow in the emitter-base circuit, and means for coupling the signal output of said oscillator circuit to said receiver unit.

4. In a telephone substation instrument adapted for use in a telephone system including a multi-winding induction coil and a receiver unit having a diaphragm for reproducing voice signals, signal generating means for generating diaphragm vibrating signals responsive to the coupling of ringing signals thereto including an oscillator circuit comprising a transistor device having an emitter element, a collector element and a base element, means for converting said ringing signals to pulsating direct current signals for coupling to said emitter and collector elements to bias the emitter-collector path for conduction, means connecting a first one of said windings in the collector output circuit, a regenerative feedback circuit including a parallel resonant circuit comprised of a capacitor and a second and third one of said windings, which are wound in opposition to said first winding, and means connecting said parallel resonant circuit between said base and collector elements in series with a coupling capacitor and a resistor, a rectifier device connected between said base and said emitter elements, and means for coupling the signal output of said oscillator circuit to said receiver unit.

5. A telephone substation instrument as set forth in claim 4 which includes resistor means connected between said emitter element and said source means.

References Cited in the file of this patent

UNITED STATES PATENTS

| | | |
|---|---|---|
| 2,130,468 | Martin | Sept. 20, 1938 |
| 2,761,909 | Wallace | Sept. 4, 1956 |
| 2,824,175 | Meacham | Feb. 18, 1958 |